United States Patent [19]
Holladay et al.

[11] Patent Number: 5,394,252
[45] Date of Patent: Feb. 28, 1995

[54] HYBRID QUANTIZATION METHOD FOR COLOR DOCUMENT REPRODUCTION

[75] Inventors: Thomas M. Holladay; Reiner Eschbach, both of Webster, N.Y.

[73] Assignee: Xerox Corporation, Stamford, Conn.

[21] Appl. No.: 204,921

[22] Filed: Mar. 2, 1994

[51] Int. Cl.⁶ .......................... H04N 1/40; H04N 1/46
[52] U.S. Cl. .................................. 358/533; 358/534; 358/535; 358/536
[58] Field of Search ............... 358/454, 456, 457, 458, 358/460, 462, 455, 298, 533, 534, 535, 536

[56] References Cited

U.S. PATENT DOCUMENTS

| | | |
|---|---|---|
| 4,149,194 | 4/1979 | Holladay . |
| 4,485,397 | 11/1984 | Scheuter et al. . |
| 4,876,611 | 10/1989 | Fischer et al. ................. 358/456 |
| 5,014,123 | 5/1991 | Imoto . |
| 5,045,952 | 9/1991 | Eschbach . |
| 5,223,953 | 6/1993 | Williams ........................ 358/456 |
| 5,225,915 | 7/1993 | Ciccone et al. ................. 358/454 |
| 5,226,094 | 7/1993 | Eschbach . |
| 5,278,670 | 1/1994 | Eschbach . |

OTHER PUBLICATIONS

An Adaptive Algorithm for Spatial Greyscale; Floyd et al.; Proceedings of the SID, 17/2, 75–77 (1976).
Analytic Description of the I-D Error Diffusion Technique for Halftoning; Optics Communications; vol. 52; No. 3; Eschbach et al.; 1984; pp. 165–168.
On the Error Diffusion Technique for Electronic Halftoning; Billotet-Hoffmann et al.; Proceedings of the SID, vol. 24/3; 1983; pp. 253–258.
Images from Computers; M. R. Schroeder; IEEE Spectrum; pp. 66–78; 1969.
Binarization Using a Two-Dimensional Pulse-Density Modulation; Eschbach et al.; J. Opt. Soc. Am.; A/vol. 4; No. 10/Oct. 1987; 1873–1878.
Pulse-Density Modulation of Rastered Media: Combining Pulse-Density Modulation and Error Diffusion; Eschbach; J. Opt. Soc. Am. A/vol. 7, No. 4/Apr. 1990; 708–716.

*Primary Examiner*—Scott A. Rogers
*Attorney, Agent, or Firm*—Mark Costello

[57] ABSTRACT

An image processing system for preparing a color document for printing, each discrete area or pixel in the image described by a signal having a number of possible states greater than can be rendered by a selected printer, in which each separation of the image is halftoned, with at least one of the separations processed with a non-periodic halftoning method, and at least one of the remaining separations processed with a periodic pattern. Preferably, in a printer printing with colorants approximating cyan, magenta, yellow and black, one of the non-yellow separations is processed with the non-periodic halftoning method.

15 Claims, 3 Drawing Sheets

HYBRID QUANTIZATION METHOD FOR COLOR DOCUMENT REPRODUCTION

This invention relates to quantization or halftoning in color documents to be printed, and more particularly to a hybrid method of halftoning using periodic and non-periodic processes to prevent formation of moiré in color document reproduction.

BACKGROUND OF THE INVENTION

Color in documents is the result of a combination of a limited set of colors over a small area, in densities selected to integrate to a desired color response. This is accomplished in many printing devices by reproducing separations of the image, where each separation provides varying density of a single primary color. When combined together with other separations, the result is a full color image.

In the digital reproduction of documents, a separation is conveniently represented as a monochromatic bitmap, which may be described as an electronic image with discrete signals (hereinafter, pixels) defined by position and density. In such a system, density is described as one level in a number of possible states or levels. When more than two levels of density are used in the description of the image, the levels are often termed "gray", indicating that they vary between a maximum and minimum, and without reference to their actual color. Most printing systems have the ability to reproduce an image with a small number of levels, most commonly two, although other numbers are possible. Common input devices including document scanners, digital cameras and the computer imagery generators, however, are capable of describing an image with a substantially larger number of gray levels, with 256 levels a commonly selected number, although larger and smaller levels are possible. It is required that an image initially described at a large set of levels also be describable at a smaller set of levels, in a manner which captures the intent of the user. In digital reproduction of color documents this means that each of the color separations is reduced from the input number of levels to a smaller output number of levels. The multiple color separations are combined together at printing to yield the final color print. Commonly, color documents are formed using cyan, magenta and yellow colorants or cyan, magenta, yellow and black colorants. A larger number or alternative colorants may also be used.

In printing documents, the desired density of color over an area is commonly achieved by halftoning, where separation density variation is represented by placing greater or less numbers of ON pixels in a discrete area of a separation. In one halftoning method known as dithering or screening, over a given area having a number of gray separation pixels therein, a value representing the density of each separation pixel of an array of gray separation pixels within the area is compared to one of a set of preselected thresholds (the thresholds are stored as a dither matrix and the repetitive pattern generated by this matrix is considered a halftone cell) as taught, for example, in U.S. Pat. No. 4,149,194 to Holladay. The effect of such an arrangement is that, for an area where the image is gray, some of the thresholds within the dither matrix will be exceeded, i.e. the image value at that specific location is larger than the value stored in the dither matrix for that same location, while others are not. In the binary case, the separation pixels or cell elements for which the thresholds are exceeded might be printed as a maximum colorant value, while the remaining separation pixels are allowed to remain white, dependent on the actual physical quantity described by the data. The described halftoning method produces an output pattern that is periodic or quasi-periodic in the spatial coordinates.

Dithering creates problems in color document reproduction where the repeating pattern of a screen through the image, when superposed over similar repeating patterns in multiple separations, can cause moiré or other artifacts, particularly in printing systems with less than ideal registration between separations. The artifacts caused by mis-registration can be understood from simple examples.

Assuming for simplicity two separations having halftone screens having identical screen frequencies and angles. Printing those two separations on top one another in perfect registration will give a homogeneous color without periodic artifacts. If the second screen is spatially shifted with respect to the first screen, a strong shift in the output color will occur. Printing systems that are likely to have such a spatial displacement between the separations due to physical limitations are prone to color shift artifacts in the final prints. A different type of artifact occurs if the printing system is likely to have a slight rotation between separations. In these instances, a color moiré is formed spatially progressing from one color to another.

In another example, assuming again for simplicity two separations having halftone screens having identical screen frequencies but different angles. Printing those two separations on top one another in perfect registration will give a homogeneous color and, depending on the angle between the two separations, a high or low frequency moiré. In situations where the angle is large (e.g.: 30°) a high frequency moiré occurs which is usually not distracting, and in cases where the angle is small (e.g.: 2°) a low frequency moiré occurs which is usually distracting. If these two separations are printed shifted with respect to one another, no color shift is perceived in constant color areas, and no change in the moiré frequency occurs. A halftone screen scheme using different angles for the different color separations is therefore less sensitive to a spatial displacement than a scheme using identical angles for all separations. If the two separations are printed with a change in the angle between the separations, the frequency and direction of the moiré is altered and a non-objectionable moiré might be changed to an objectionable moiré.

There are always 2-way moiré patterns between the color separations, but the angles are chosen to maximize the frequency of the moirés (they are about ½ the screen frequency). These are the "rosettes" noted in magnified color halftones. This is true of both analog (photographic) and digital systems and is not a significant quality problem. Whenever a fourth color (black or "key") is included, there is another moiré pattern, formed by a 3-way interaction between cyan, magenta and black. In analog systems, this is at zero frequency. In digital systems which use the Holladay rational angle screens, or the like angles of exactly 15 degrees are not possible, so the 3-way moiré is not quite at zero frequency, but is at a very objectionable low frequency.

The color halftoning scheme using different angles for some or all of the color separations is common for applications that have slight mis-registrations due to physical limitations. Accordingly, and with reference again to U.S. Pat. No. 4,194,194 to Holladay, the angle of the screen can be changed to generate similar screen patterns which do not strongly beat visually against each other, with the result the objectionable moiré is reduced. Particularly critical are the angles between the most prominent colors, particularly cyan, magenta and black (if present). A common arrangement of rotated screen angles is 0°, 15°, 45° and 75° for yellow, cyan, black and magenta, respectively, in which case all separations are commonly halftoned using the same screen frequency, sometimes with the exception of yellow. However, objectionable patternings still can occur.

The above described halftoning processes generate periodic halftone patterns. Other methods exist that generate non-periodic or quasi non-periodic structure. Examples for such methods are error diffusion and similar halftoning processes, stochastic screening and pulse density modulation.

Error diffusion, is taught, in "An Adaptive Algorithm for Spatial Greyscale" by Floyd and Steinberg, Proceedings of the SID 17/2, 75-77 (1976) (hereinafter, "Floyd and Steinberg"). Another, more elaborate method would be the error diffusion techniques of U.S. Pat. No. 5,045,952 to Eschbach, which serves to provide image dependent edge enhancement, assigned to the same assignee as the present invention. Error diffusion attempts to maintain gray by making the conversion from gray pixels to binary or other level pixels on a pixel-by-pixel basis. The procedure examines each pixel with respect to a threshold, and the difference between the gray level pixel value and the output value is forwarded to a selected group or set of neighboring pixels, in accordance with a weighting scheme. The output binary pattern of the error diffusion algorithm and its derivatives is a pattern with a local periodicity related to the input density level, but with no global periodicity, see "Analytic Description of the 1-D Error Diffusion Technique for Halftoning," Optics Communications, Vol. 52, No. 3, 165-168 (1984) by R. Eschbach and R. Hauck.

Other error diffusion methods include, "On the Error Diffusion Technique for Electronic Halftoning" by Billotet-Hoffmann and Bryngdahl, Proceedings of the SID, Vol. 24/3, (1983), pp. 253-258; and U.S. Pat. No. 5,226,094 to Eschbach. A technique related to error diffusion is taught in the MAE (Minimum Average Error) method of error diffusion described in "Images from Computers", by M. Schroeder, IEEE Spectrum, March 1969, pp. 66-78, in which an error correction is performed that only affects a local neighborhood. This method does not preserve the gray density. One particularly effective error diffusion variant is taught in co-pending U.S. patent application No. 08/167,758, filed Dec. 15, 1993, entitled "Method for Quantization Gray Level Pixel Data with Extended Distribution Set", by J. Shiau and Z. Fan.

Error diffusion, because it operates on a pixel-by-pixel basis is non-periodic, which mitigates the problems of moiré. However, since error diffusion is a deterministic process, misregistration of the different deterministic color separations can lead to a color shift. This color shift can be reduced by introducing a random element into the error diffusion process, but at the expense of image noise.

Stochastic screening (of which error diffusion might be considered one type) describes other ways to generate a non-periodic output pattern. U.S. Pat. No. 4,485,397 to Scheuter et al. describes a method for generating a non-periodic halftone distribution by determining areas of constant or nearly constant input density and by distributing a precalculated number of print dots inside each area based on a random or pseudo random number and some spatial constraints.

U.S. Pat. No. 4,876,611 to Fischer et al. describes another stochastic screening algorithm in which the print/no-print decision is based on a recursive subdivision of the print field maintaining average density over the larger print field.

A non-periodic halftoning scheme based on a pulse-density modulation is taught in "Binarization using a two-dimensional pulse-density modulation", by R. Eschbach and R. Hauck, Journal of the Optical Society of America A, 4, 1873-1878 (1987) and "Pulse-density modulation on rastered media: combining pulse-density modulation and error diffusion", by R. Eschbach, Journal of the Optical Society of America A, 7, 708-716 (1990). In pulse-density modulation a mathematical model is used that guarantees the local density of print pulses as a function of the input image data.

One of the advantages of stochastic, non-periodic screening over periodic screening is the suppression of moiré. However, mis-registration usually causes color shifts in stochastic screens, since the stochastic screens are largely deterministic. The color shifts can be reduced by introducing randomness into the screening process, but this reduces the overall print quality by introducing visually non-pleasing noise.

In general it can be said that periodic halftone schemes suffer from a combination of color moiré and color shifts on mis-registration, dependent on the actual scheme; that deterministic non-periodic halftone schemes suffer from color shifts on mis-registration; and that non-periodic random schemes suffer from image noise.

In U.S. Pat. No. 5,278,670 to Eschbach, a method of resolution conversion was described which suggested that the quantization step required could select either dithering or error diffusion, the selection based on a metric related to document content. The decision made applies to all the image separations describing an area.

U.S. Pat. No. 5,223,953 to Williams teaches an alternative hardware implementation of Holladay.

U.S. Pat. No. 5,225,915 to Ciccone et al. illustrates that the addition of noise or enhancement of inherent noise can mask the structure moiré. However, such schemes inherently alter the accuracy of the image.

U.S. patent application No. 07/922,421, filed Jul. 31, 1992, entitled "High Addressability Error Diffusion with Minimum Mark Size", by R. Eschbach, provides a discussion on the implementation of error diffusion in a high addressability printing system, while maintaining a minimum mark size. This reference is incorporated by reference for its teachings.

All of the references cited herein are incorporated by reference for their teachings.

SUMMARY OF THE INVENTION

In accordance with the invention, there is provided a method of preparing a multi separation color document for printing, by processing certain separations with periodic halftoning methods and by processing other separations with non-periodic halftone methods.

In accordance with one aspect of the invention, there is provided an image processing system for preparing a document for printing which receives multi separation color documents for printing, each discrete area or pixel in the image described by a signal having a number of possible states greater than can be rendered by a selected printer. In such a system, each separation of the image is processed, with at least one of the separations processed with a non-periodic halftoning method, and at least one of the remaining separations processed with a periodic pattern. Preferably, in a printer printing with colorants approximating cyan, magenta, yellow and black, one of the non-yellow separations is processed with the non-periodic halftoning method.

In accordance with another aspect of the invention, non-periodic methods of halftoning include error diffusion and similar halftoning processes, random screening and pulse density modulation. Periodic methods of halftoning include dithering.

Proposed is a simple method of processing color documents, which removes, mitigates or reduces moiré in color reproduction using halftones. The advantage of this hybrid scheme is the insensitivity to moiré and color shifts. Use of a non-periodic pattern for the halftone representation of one of the non-yellow separations eliminate the moiré patterns commonly noted with dithering methods. While error diffusion is used, color shifting is minimized because there is no mis-registration within another error diffused separation.

In printing at high resolutions, error diffusion (along with most other "random" patterns) is generally considered unprintable, in that the printers print single pixel patterns very unreliably. Single pixels (black pixels surrounded by white pixels and vice versa) are common in random patterns. However, some printers are getting control of printing single pixels. More importantly, recent work by Eschbach exemplified by the patents cited herein, among others, has demonstrated ways to control error diffusion to reduce the number of isolated pixels. Thus, it now becomes reasonable to make the black halftone by error diffusion, after which the rational angles become acceptable for the other 3 color separations.

These and other aspects of the invention will become apparent from the following descriptions to illustrate a preferred embodiment of the invention read in conjunction with the accompanying drawings in which.

Figure 1:
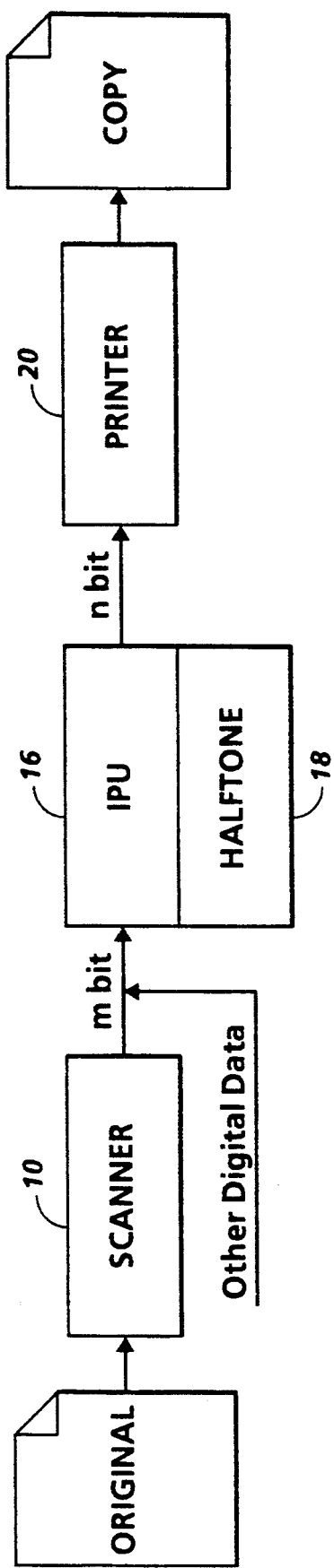
FIG. 1 is a simplified description of a digital color printer in which the present invention may find advantageous use.

Referring now to the drawings where the showings are for the purpose of describing an embodiment of the invention and not for limiting same, a basic image processing system is shown in FIG. 1. In the present case, gray image data may be characterized as image signals, each pixel of which is defined at a single level or optical density in a set of 'c' optical density levels, the number of members in the set of levels being larger than desired. Each pixel will be processed in the manner described hereinbelow, to redefine each pixel in terms of a new, smaller set of 'd' levels. In this process, 'c' and 'd' are integer values representing pixel depth, or a number of signal levels at which the pixel may appear. One common case of this method includes the conversion of data from a relatively large set of gray levels to one of two legal or allowed binary levels for printing in a binary printer.

As used herein, the term "dot" refers to a product or an image resulting from a screening process. A "screen cell", as used herein, refers to the set of pixels which together will form the dot, while the term "screen matrix" will be used to describe the set of values which together make up the set of threshold to be applied. A "pixel" refers to an image signal associated with a particular position in an image, having a density between white and black. Accordingly, pixels are defined by intensity and position. A dot is made up of a plurality of pixels. While printers print pixels (sometimes referred to as "spots") halftoning methods tend to cluster the pixels together into a dot. Dots of clustered pixels have better reproduction characteristics on some printing hardware than unclustered pixels. These terms are used for simplification and it should be understood that the appropriate sizing operations have to be performed for images where the input resolution in terms of scan pixels is different from the output resolution in terms of print pixels.

In the particular color system to be discussed, color documents are represented by multiple sets of image signals, each set (or separation) represented by an independent channel, which is usually processed independently. A "color image" as used herein is therefore a document including at least two separations, such as in the Xerox 4850 Highlight Color Printer and commonly three or four separations, such as in the Xerox 4700 Color Laser Printer or the Xerox 5775 Digital Color Copier, or sometimes more than 4 separations. One possible digital copier (a scanner/printer combination) is described for example, in U.S. Pat. No. 5,014,123, incorporated herein by reference. Each separation provides a set of image signals which will drive a printer to produce one color of the image. In the case of multicolor printers, the separations superposed together form the color image. In this context, we will describe pixels as discrete image signals, which represent optical density of the document image in a given small area thereof. The term "pixel" will be used to refer to such an image signal in each separation, as distinguished from "color pixel", which is the sum of the color densities of corresponding pixels in each separation. "Gray", as used herein does not refer to a color unless specifically identified as such. Rather, the term refers to image signals which vary between maximum and minimum, irrespective of the color of the separation in which the signals are used.

With reference now to FIG. 1, which shows a general system requirement representing the goal of the invention, an electronic representation of a document (hereinafter, an image) from image input terminal such as scanner 10 derives electronic digital data in some manner, in a format related to the physical characteristics of the device, and commonly with pixels defined at m bits per pixel. Common color scanners, such, for example, Xerox 5775 Digital Color Copiers, or the Pixelcraft 7650C, produce 8 bit/pixel data, at resolutions acceptable for many purposes. Since this is a color document, the image is defined with two or more separation bitmaps, usually with identical resolution and pixel depth. The electronic image signals are directed through an image processing unit (IPU) 16 to be processed so that an image suitable for reproduction on image output terminal or printer 20 is obtained. Image processing unit 16 commonly includes a halftone processor 18 which converts m bit digital image signals to n bit digital image signals, suitable for driving a particular printer, where m and n are integer values.

Figure 2:
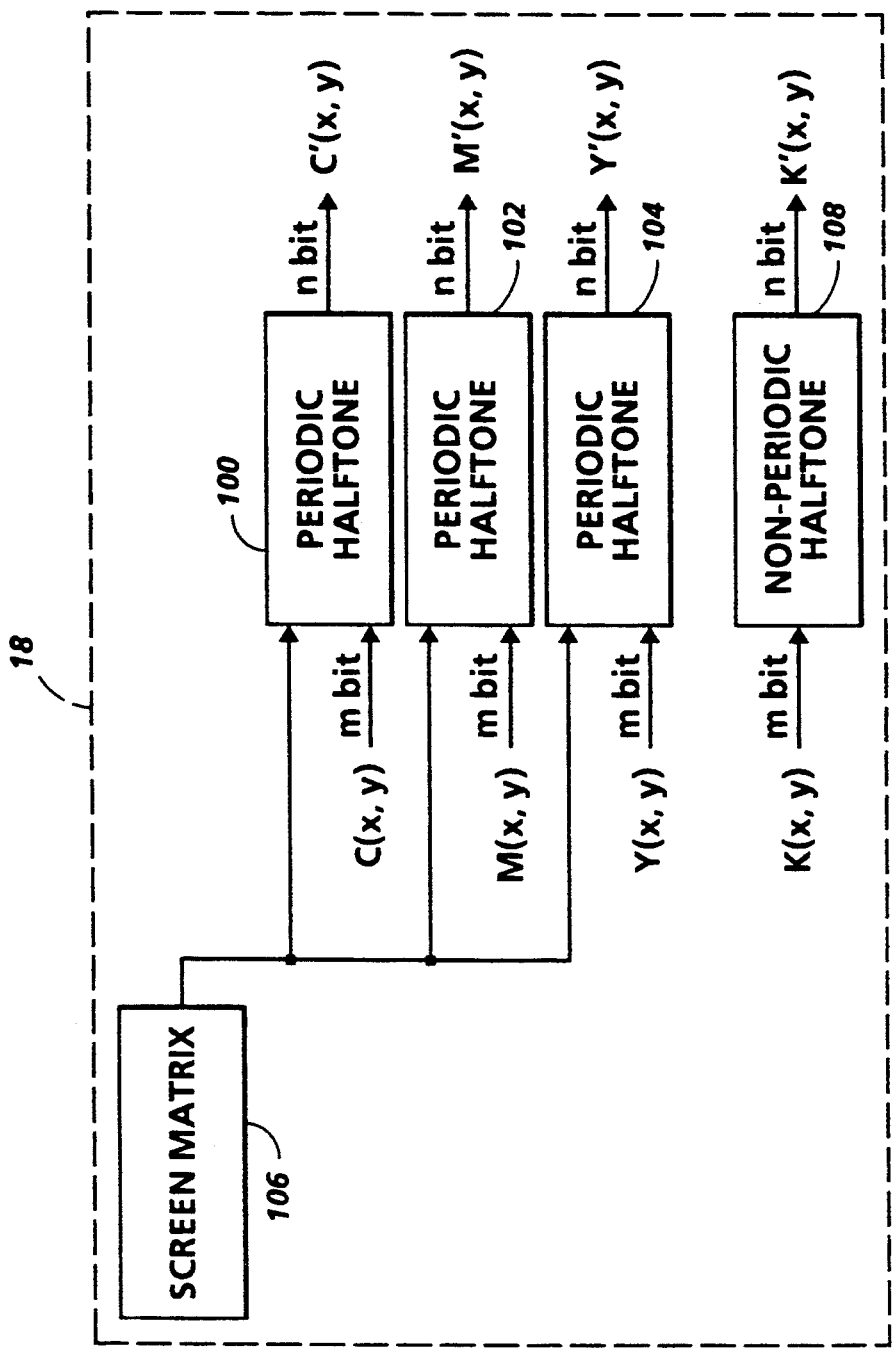
FIG. 2 is a schematic block diagram of a halftoning circuit in which the invention is implemented.

FIG. 2 shows the halftone processor 18 operational characteristics. Four separations, C(x,y), M(x,y), Y(x,y), K(x,y), obtained, are each processed independently for halftoning purposes to reduce an m-bit input to an n-bit output, where x and y represent two dimensional position on a page. In accordance with the invention, cyan, magenta and yellow separations are processed with a screening method, preferably with rotated screens at periodic halftone processors 100, 102 and 104. These are periodic halftone processors, using a screen matrix stored in screen matrix memory 106, which, for a given gray level reproduce a periodic dot pattern. While screening may be described for simplicity as the addition of a set of selected screen values to image signals within a defined area of the image, in conjunction with a uniform application of a threshold level(s) to the combined values, it will be understood that the process of screening may also be represented by a set of varying thresholds defined at locations corresponding to pixels over a given area of the image. A screen cell, is generally smaller than the total image and will be replicated in a predetermined scheme for processing the image in order to cover an area of the image. A method for an efficient representation of variable or rotated angle screen cells by a screen matrix and a corresponding replication scheme, is given in U.S. Pat. No. 4,149,194 to Holladay. The output of a process using a screen cell is a set of pixels, defined by a set of levels having a number of members less than the input set of values. Commonly, the set of n-bit output values is binary, either black or white, or a spot or no spot, although the values might be gray. The binary output of a single halftone cell is a set of pixels that are either black or white, which together form a "dot". The periodic halftone processors 100, 102 and 104 return an n bit value representing the separation.

The remaining black separation K(x,y) is halftoned with a stochastic or non-periodic halftoning method, such as error diffusion, at non-periodic halftone processor 108 to reduce an m-bit input to an n-bit output K'(x,y), preferably as taught by co-pending U.S. patent application No. 08/167,758, filed Dec. 15, 1993, entitled "Method for Quantization Gray Level Pixel Data with Extended Distribution Set", by J. Shiau and Z. Fan. Alternatively, the edge enhancing method of U.S. Pat. No. 5,045,952 to Eschbach may be used, or any combination thereof. While FIG. 2 illustrates the black separation as the only separation halftoned with a non-periodic method, it will no doubt be appreciated that the present invention might also be effective with one or more of the other separations halftoned with a non-periodic methods.

Figure 3A:
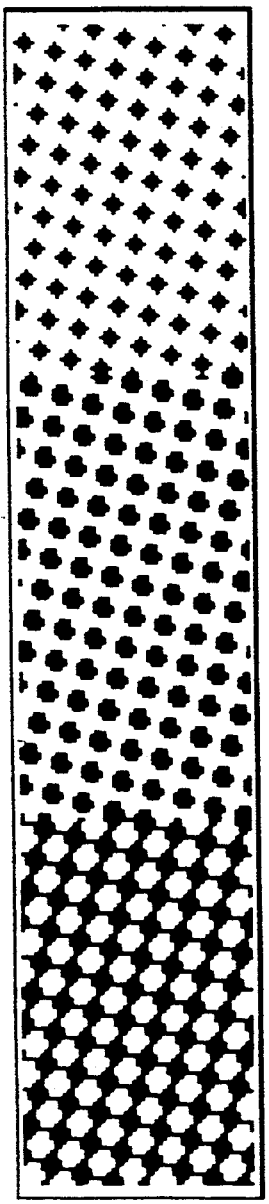
FIGS. 3A, 3B and 3C show sections of identical portions separations forming a color image, illustrating the principle of the invention.
Figure 3B:
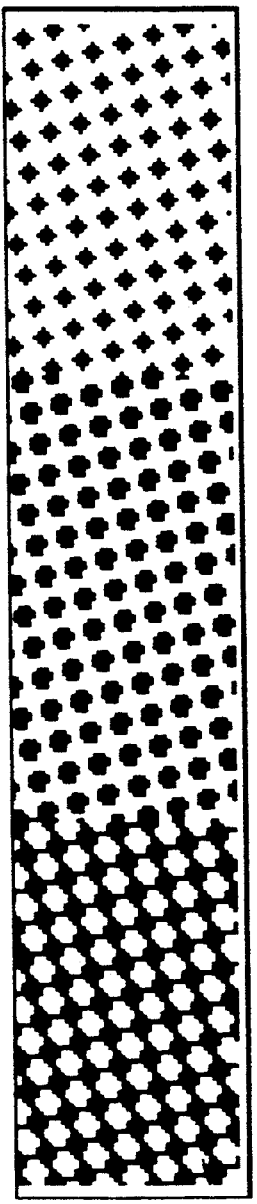
Figure 3C:
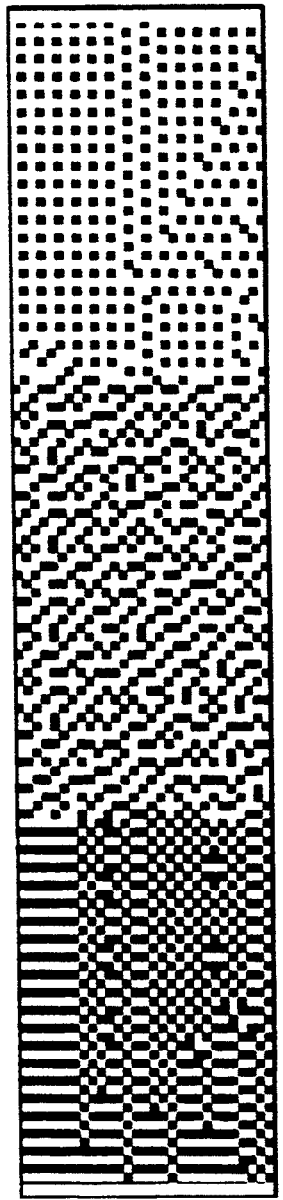

With reference to FIGS. 3A, 3B and 3C, an image with one possible color and black is shown. An original image (not shown) is formed with three areas with colors C, M, K={125, 160, 192} in a 256 bit system, where 0 is black and 255 is white. FIGS. 3A, 3B and 3C show the cyan, magenta and black separations (highly enlarged) after halftoning. FIGS. 3A and 3B illustrate a dithering screening process, where pixels turned ON in the halftoning process are clustered into dots, in periodic patterns. Additionally, it will be noted that the dots are arranged at an angle across the page, with the cyan separation dots at an angle $\theta_C \approx 75°$ and the magenta separation dots at an angle $\theta_M \approx 15°$. FIG. 3C illustrates an error diffusion process (particularly the Floyd and Steinberg process). It will be noted that the error diffused separation does not have a fixed frequency or screen angle. Note that in FIG. 3C an input resolution of ½ the screen resolution was used and that the error diffusion pulses in this example have the size of the input resolution pixel which is identical in this example to 2×2 output resolution pixels. The exact relationship of stochastic screen spotsize and raster addressability are a function of the actual print devices.

Clearly other halftoning methods having a stochastic character can be used to process the black separation, including random halftoning, pulse density modulation methods and the several error diffusion variants described previously.

The invention has been described for the standard 4 color printing process, but it will be appreciated that the invention can be used in other color printing processes such as 7 color or HiFi color printing.

It will no doubt be appreciated that the present invention may be accomplished with either software, hardware or combination software-hardware implementations. Additionally, it will be recognized that the invention has application in both standard and high addressability digital printing systems.

The invention has been described with reference to a particular embodiment. Modifications and alterations will occur to others upon reading and understanding this specification. It is intended that all such modifications and alterations are included insofar as they come within the scope of the appended claims or equivalents thereof.

We claim:

1. A color printing system, including a processor preparing color documents for printing, said color documents each including a plurality of separations, each separation defined with a set of image signals describing optical density with m density levels, while a destination printer is capable of rendering density with n density levels, comprising:

a printer, adapted to print a plurality of color separations, so that when the separations are superposed on a final substrate, a selected color is defined;

a source of image signals describing a color document with a like plurality of color separations, each image signal representing optical density with one of m levels for a discrete area of a separation;

a first halftone processor operatively connected to said source of image signals and reducing the number of levels m representing optical density in a non-zero, predetermined subset of the separations to a number of levels n representing optical density, said means generating a periodic pattern thereby;

a second halftone processor operatively connected to said source of image signals for reducing the number of levels m representing optical density in at least one remaining separation to a number of levels n representing optical density, said means generating a non-periodic pattern thereby;

an image processor directing signals processed at each halftone processor to said printer to print said processed color image.

2. A device as defined in claim 1, wherein the number of color separations is four.

3. A device as defined in claim 2, wherein said predetermined subset includes three separations.

4. A device as defined in claim 1, wherein said predetermined subset includes the number of color separations, minus 1.

5. A device as defined in claim 1, wherein said remaining separations includes only one separation.

6. A device as defined in claim 5, wherein said only one remaining separation includes only a black color separation.

7. The device as defined in claim 1, wherein said first halftone processor includes:
- an input receiving color image signals each defined at one of m levels for a given area of the image;
- a screen matrix memory storing a set of thresholds for repetitive application to the image signals; and
- a comparator comparing the density of each pixel of an array of separation pixels to one of a set of preselected thresholds stored in the screen matrix memory.

8. A method of preparing color documents for printing, said color documents each including a plurality of separations, each separation defined with a set of image signals describing optical density with set of m density levels, while a destination printer is capable of rendering density with n density levels, the steps including:
- receiving a set of image signals describing a color document with a like plurality of color separations, each image signal representing optical density with one of m levels for a discrete area of a separation;
- for a non-zero predetermined subset of the color separations, halftoning the m level image signals to n level image signals, in a manner generating a periodic pattern having a fixed frequency for the predetermined subset, and a distinct fixed angle for each of the plurality of separations;
- for a non-zero remaining subset of the color separations, halftoning the m level image signals to n level image signals, in a substantially stochastic manner;
- directing halftoned signals to a printer adaptable to print n levels to print said color image so that when the separations are superposed on a final substrate, a selected color is defined.

9. A method as defined in claim 8, wherein the number of color separations is four.

10. A device as defined in claim 9, wherein said predetermined subset includes three separations.

11. A device as defined in claim 8, wherein said predetermined subset includes the number of color separations, minus 1.

12. A device as defined in claim 8, wherein said remaining separations includes only one separation.

13. A device as defined in claim 12, wherein said only one remaining separation includes only a black color separation.

14. The device as defined in claim 8, wherein said first halftone processor includes:
- an input receiving color image signals each defined at one of m levels for a given area of the image;
- a screen matrix memory storing a set of thresholds for repetitive application to the image signals; and
- a comparator comparing the density of each pixel of an array of separation pixels to one of a set of preselected thresholds stored in the screen matrix memory.

15. A color printing system, including a processor preparing color documents for printing, said color documents each including a plurality of separations, each separation defined with a set of image signals describing optical density with a set of m density levels, while a destination printer is capable of rendering density with n density levels, comprising:
- a printer, adapted to print separations of cyan, magenta, yellow and black, so that when the separations are superposed on a final substrate, a selected color is defined;
- a source of cyan, magenta, yellow and black image signals describing a color document, each image signal representing optical density with one of m levels for a discrete area of a separation;
- a first halftone processor operatively connected to said source of image signals for reducing the number of levels m representing optical density in said magenta, cyan and yellow separations to a number of levels n representing optical density, said means generating a periodic pattern thereby;
- a second halftone processor operatively connected to said source of image signals for reducing the number of levels m representing optical density in the black separation to a number of levels n representing optical density, said means generating a nonperiodic pattern thereby;
- an image processor directing halftoned image data from the halftone processor to said printer.

* * * * *